(12) United States Patent
Keefer et al.

(10) Patent No.: US 8,376,169 B2
(45) Date of Patent: Feb. 19, 2013

(54) ANTI-SIPHON INSTALLATION ASSEMBLY

(76) Inventors: Neal L. Keefer, Portland, OR (US); Kenneth A. Watson, Vancouver, WA (US); Evan Waymire, West Linn, OR (US)

( * ) Notice: Subject to any disclaimer, the term of this patent is extended or adjusted under 35 U.S.C. 154(b) by 470 days.

(21) Appl. No.: 12/657,933

(22) Filed: Jan. 29, 2010

(65) Prior Publication Data

US 2010/0193042 A1 Aug. 5, 2010

Related U.S. Application Data

(60) Provisional application No. 61/206,503, filed on Jan. 30, 2009.

(51) Int. Cl.
 *B65D 47/02* (2006.01)
 *B65D 49/00* (2006.01)
(52) U.S. Cl. .................. 220/86.3; 220/86.2; 141/390
(58) Field of Classification Search ................. 220/86.1, 220/86.2, 86.3; 137/215; 29/525.01; 141/255, 141/390, 392
See application file for complete search history.

(56) References Cited

U.S. PATENT DOCUMENTS

| | | | | | |
|---|---|---|---|---|---|
| 3,985,259 | A | * | 10/1976 | Zell et al. | 220/86.3 |
| 4,343,410 | A | * | 8/1982 | Lenda | 220/86.1 |
| 4,630,748 | A | * | 12/1986 | Keller | 220/86.3 |
| 4,650,087 | A | * | 3/1987 | White | 220/86.3 |
| 7,040,360 | B2 | * | 5/2006 | Watson | 141/255 |
| 7,721,902 | B2 | * | 5/2010 | Grote et al. | 220/86.3 |

* cited by examiner

*Primary Examiner* — Anthony Stashick
*Assistant Examiner* — Madison L Poos
(74) *Attorney, Agent, or Firm* — Ingrid McTaggart

(57) ABSTRACT

An anti-siphon installation assembly includes a spring, a retainer clip mounted on the spring, the retainer clip including a support surface adapted to support an anti-siphon device thereon, and a locator clip mounted on the spring, the locator clip including an outwardly extending arm adapted to contact the upper surface of a fuel filler neck opening.

12 Claims, 6 Drawing Sheets

ANTI-SIPHON INSTALLATION ASSEMBLY

This application claims the benefit of U.S. provisional patent application Ser. No. 61/206,503, filed on Jan. 30, 2009.

BACKGROUND OF THE INVENTION

1. Field of the Invention

The present invention relates to an anti-siphon installation assembly, and in particular, to a fuel tank anti-siphon installation assembly that facilitates ease of installation of an anti-siphon assembly into a fuel filler neck of a fuel tank, so as to reduce the ability to siphon fuel through the fuel filler neck of the fuel tank.

2. Background of the Invention

It may be desirable to install an anti-siphon device in a fuel tank to reduce siphoning of fuel from the tank. It may be difficult to install an anti-siphon device into a fuel filler neck of a fuel tank when the outer diameter of the anti-siphon device is smaller than the inner diameter of the fuel filler neck. Accordingly, it may be desirable to provide an assembly for installation of an anti-siphon device into a fuel filler neck.

OBJECTS OF THE INVENTION

It is an object of this invention to provide an anti-siphon installation assembly that facilitates installation of an anti-siphon device into a fuel filler neck of a fuel tank.

SUMMARY OF THE INVENTION

The present invention provides an assembly to facilitate installation of an anti-siphon device into a fuel filler neck of a fuel tank.

DETAILED DESCRIPTION OF THE EMBODIMENTS

Figure 1:
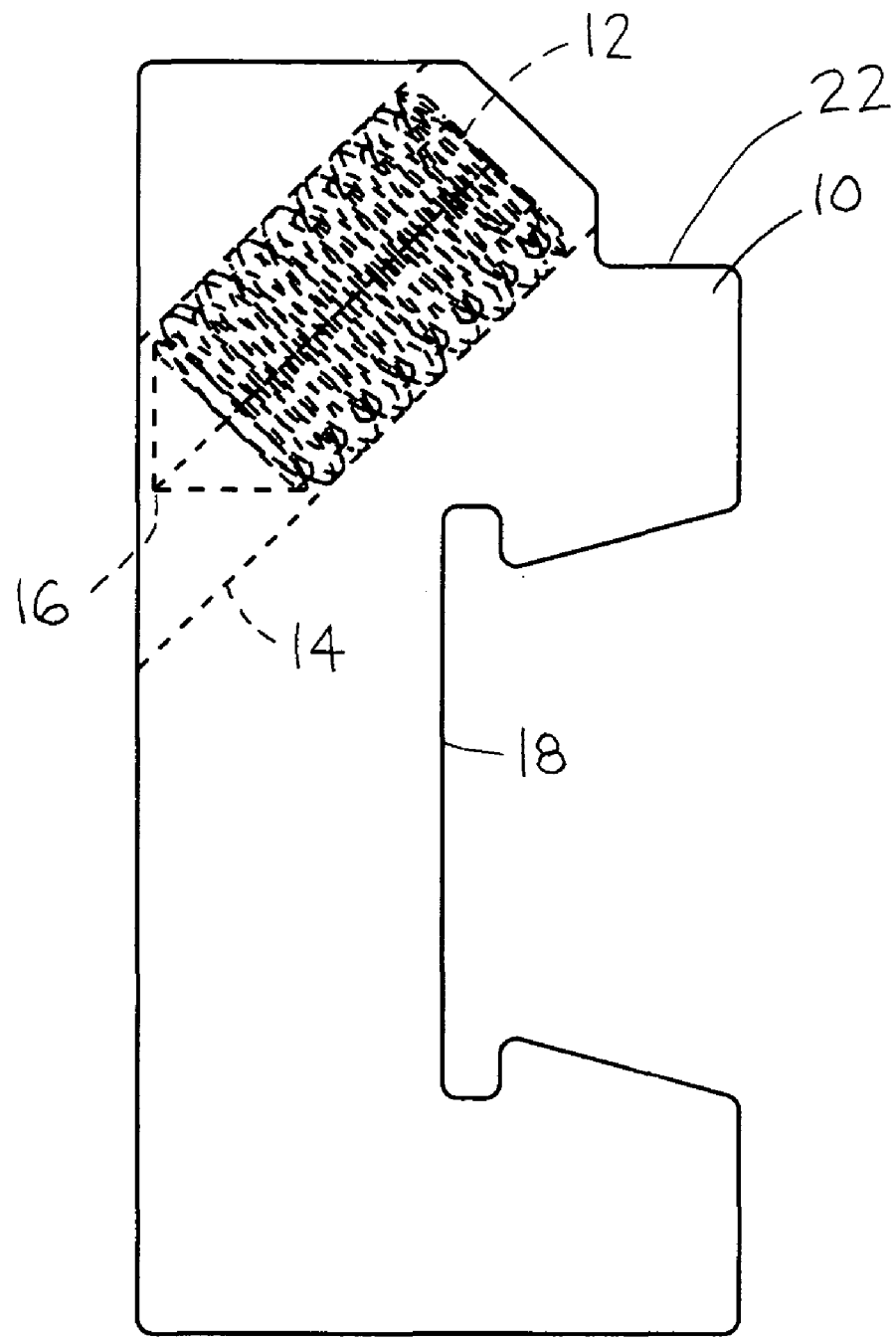
FIG. 1 is a side view of a retainer clip with a cone point set screw.

FIG. 1 is a side view of a retainer clip 10 with a set screw, such as a threaded cone point set screw 12, secured within and extending through an aperture, such as a threaded aperture 14. The cone point set screw 12 may include a point 16 at an end thereof such that point 16 may become slightly imbedded within, or may frictionally abut against, the interior wall 52 (FIG. 5) of a fuel filler neck when the set screw 12 is tightened within threaded aperture 14. In this manner, retainer clip 10 is secured within the fuel filler neck 38 (FIG. 5) of a fuel tank 54 (FIG. 5) in which the retainer clip 10 is installed.

Figure 3:
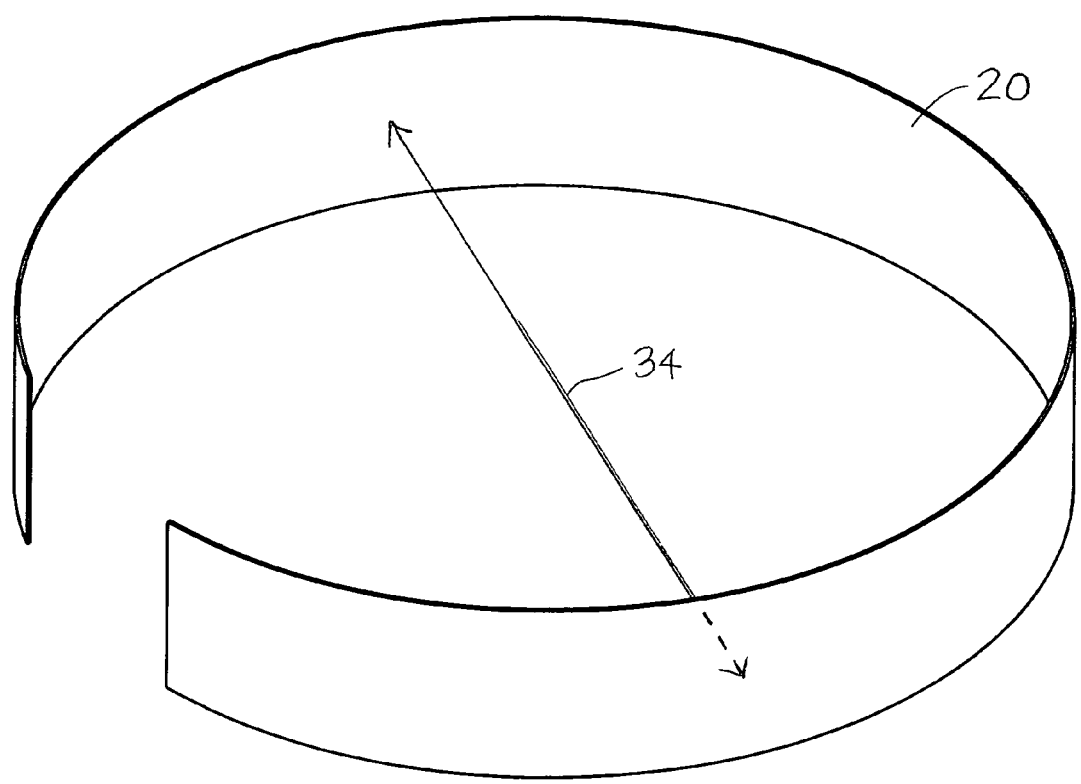
FIG. 3 is a top perspective view of an assembly spring.

Retainer clip 10 may include a recess 18 for mounting the retainer clip 10 on a spring 20 (FIG. 3). Retainer clip 10 may also include a stop surface 22, also called a support surface, for retaining the upper lip of an anti-siphon device (FIG. 5) thereon when the anti-siphon device is installed thereon. In one example embodiment, stop surface 22 may extend outwardly from recess 18 such that when retainer clip 10 is installed within a fuel filler neck (FIG. 5) of a fuel tank, the stop surface 22 will extend inwardly toward a center of the fuel filler neck. In one example embodiment of the invention, a plurality of retainer clips 10 are utilized to retain a single anti-siphon device in place within a fuel filler neck (FIG. 5) of a fuel tank.

Retainer clip 10 and set screw 12 may each be manufactured of a material that may withstand the harsh environment of the interior of a fuel filler neck, such as being manufactured of metal, including aluminum or steel, or rigid, high density plastic. Retainer clip 10 may be manufactured by a molding or an extrusion process, or may be formed from a block of the chosen manufacturing material, for example.

Figure 2:
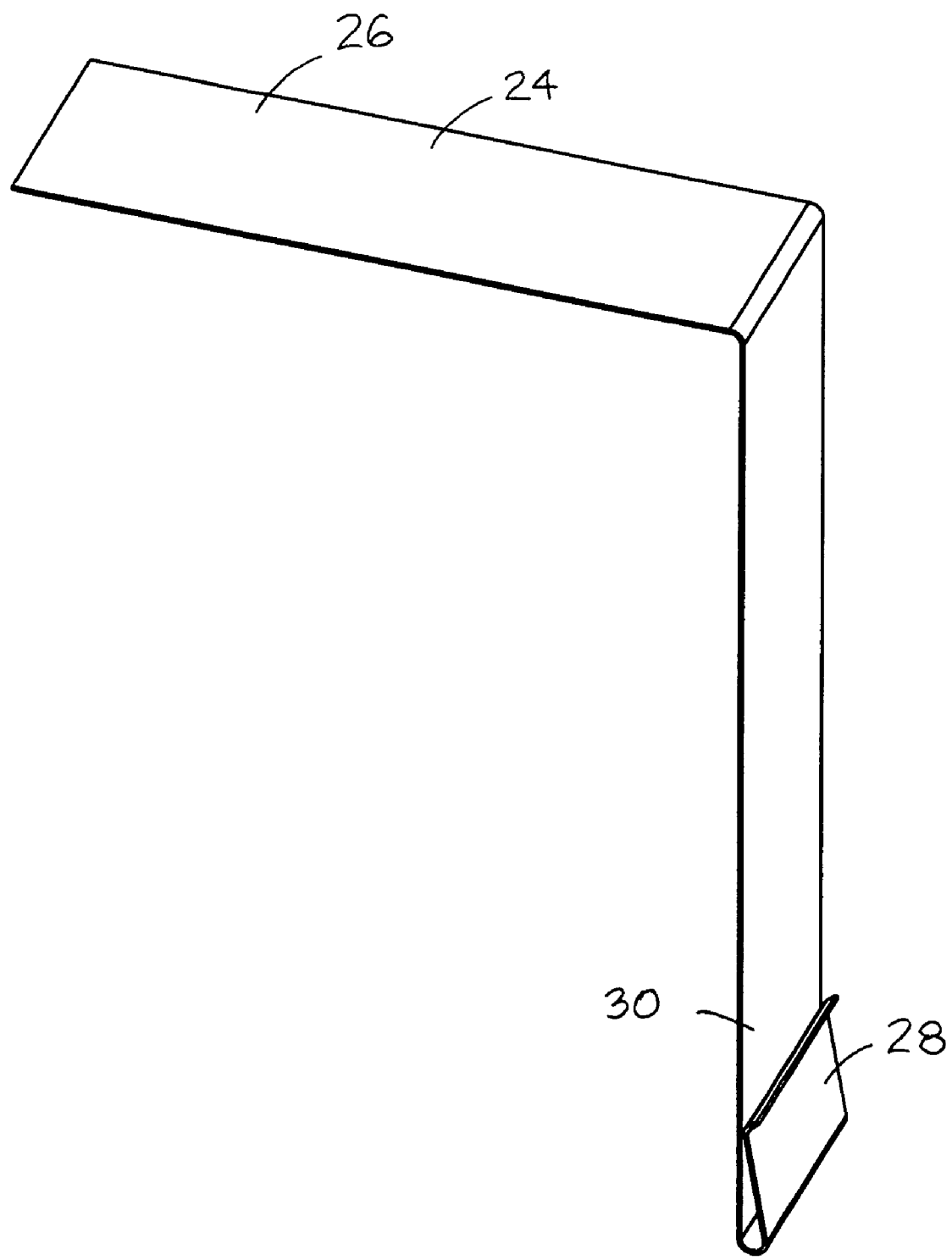
FIG. 2 is a top perspective view of a locator clip.

FIG. 2 is a top perspective view of a locator clip 24 including an outwardly extending arm 26 and an upwardly extending hook 28 in a lower region 30 of clip 24. Locator clip 24 may be utilized during the installation process of installing an anti-siphon device to position a spring 20 (FIG. 3) and multiple retainer clips 10 within a fuel filler neck. Locator clip 24 may be manufactured of a material that may be strong, lightweight, and somewhat flexible, such as manufactured from aluminum, steel or plastic, for example.

Figure 4:
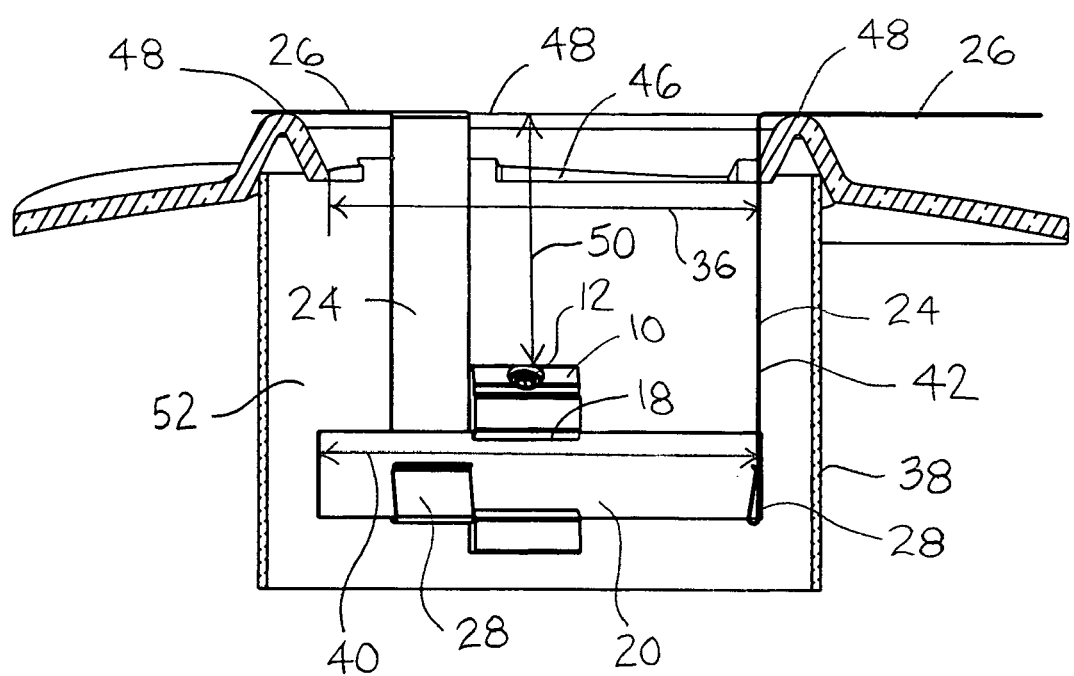
FIG. 4 is a side cross sectional view of an installation assembly in place within a fuel filler neck.

FIG. 3 is a top perspective view of spring 20. In this figure spring 20 is shown in an unbiased position such that an unbiased diameter 34 of the spring is larger than an inner diameter 36 of an opening 46 of a fuel filler neck 38 (FIG. 4). When compressed, spring 20 will define a biased diameter 40 (FIG. 4) that is smaller than the inner diameter 36 of the opening 46 of fuel filler neck 38 (FIG. 4). Once installed, spring 20 will remain within fuel filler neck 38. Accordingly, spring 20 may be manufactured of a material that may withstand the harsh environment of the interior of a fuel filler neck, such as being manufactured of metal, including aluminum or steel, or somewhat flexible, high density plastic. Spring 20 may be manufactured by a molding or an extrusion process, or from sheet or strip material, for example, and may thereafter be bent or formed into the desired shape.

FIG. 4 is a side cross sectional view of an installation assembly 42 in place within a fuel filler neck 38. To install an anti-siphon device 44 (FIG. 5) into fuel filler neck 38, multiple retainer clips 10 (only one retainer clip 10 is shown in this view for ease of illustration) and multiple locator clips 24 may be mounted on spring 20, as shown in FIG. 6. In particular, spring 20 is positioned within recess 18 of each of the retainer clips 10 and within hook 28 of each of locator clips 24. Spring 20 is then compressed to, or smaller than, biased diameter 40 such that the assembly 42 may be lowered into fuel filler neck 38 through fuel filler neck opening 46.

As the installation assembly 42, including spring 20, locator clips 24 and retainer clips 10, is lowered into fuel filler neck 38, outwardly extending arms 26 of locator clips 24 will eventually contact top surface 48 of fuel filler neck 38. Once arms 26 contact top surface 48, hook 28 of locator clips 24 may inhibit further downward movement of assembly 42 into fuel filler neck 38. In this manner the locator clips 24 may position retainer clips 10 a preferred distance 50 downwardly within fuel filler neck 38 from top surface 48. In this position, spring 20 will bias the retainer clips 10 circumferentially outwardly until each of the retainer clips 10 is in contact with inner wall 52 of fuel filler neck 38. An Allen wrench (not shown), for example, may then be extended downwardly into fuel filler neck 38 and used to tighten set screws 12 into or against the inner wall 52 of fuel filler neck 38. Once the multiple retainer clips 10 are secured in place within fuel filler neck 38 by set screws 12 and by the radially outwardly directed biasing force of spring 20, locator clips 24 may be removed. Removal of the locator clips 24 is facilitated by manufacturing them from a flexible, and somewhat thin material. In contrast, retainer clips 10 may be manufactured as thick, strong, durable clips that may physically support anti-siphon device 44 (FIG. 5) during normal use and against attempted vandalism to anti-siphon device 44.

Figure 5:
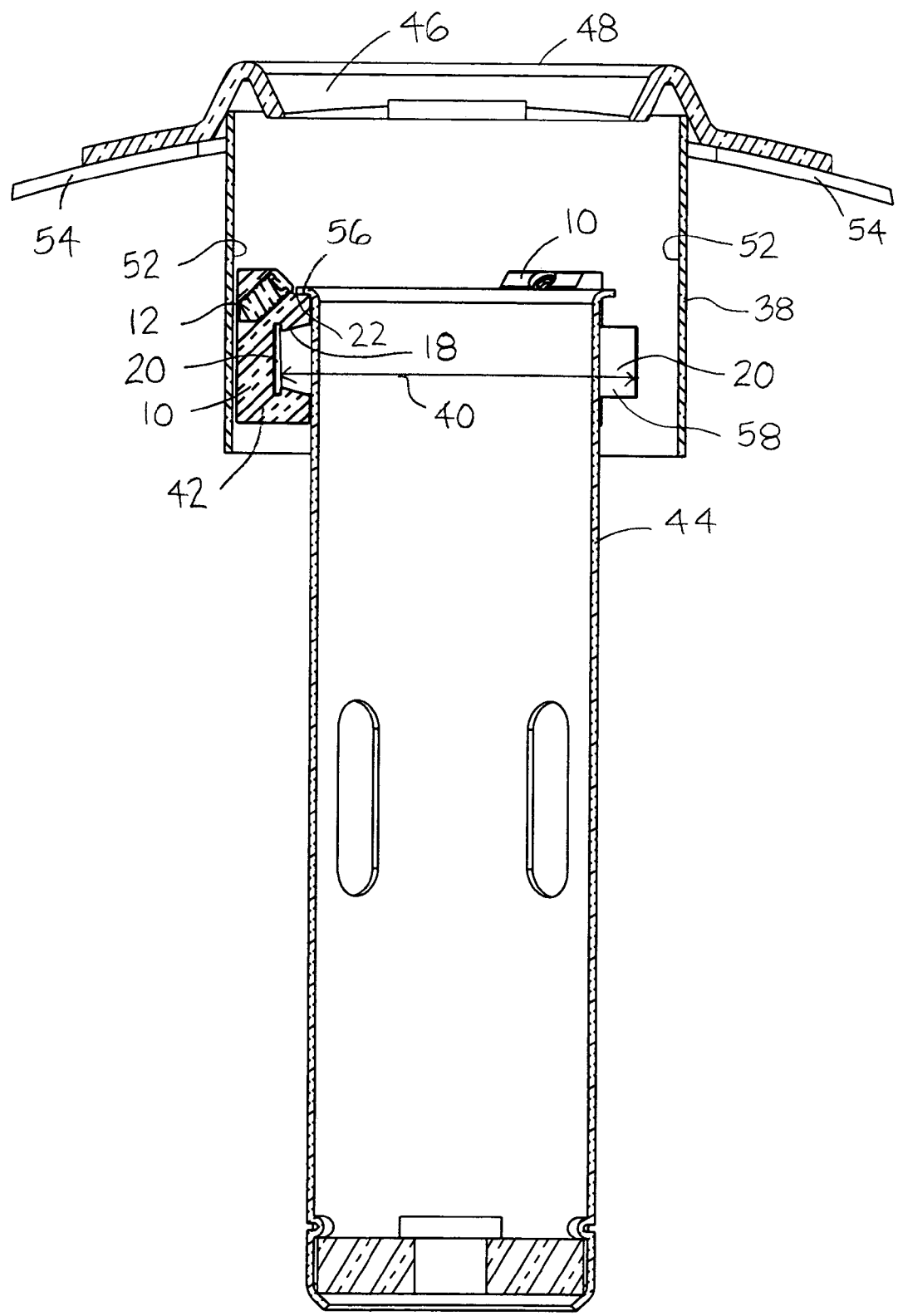
FIG. 5 is side cross sectional view of the assembly of FIG. 4 with an anti-siphon device installed in the fuel filler neck and with the locator clips removed.
Figure 6:
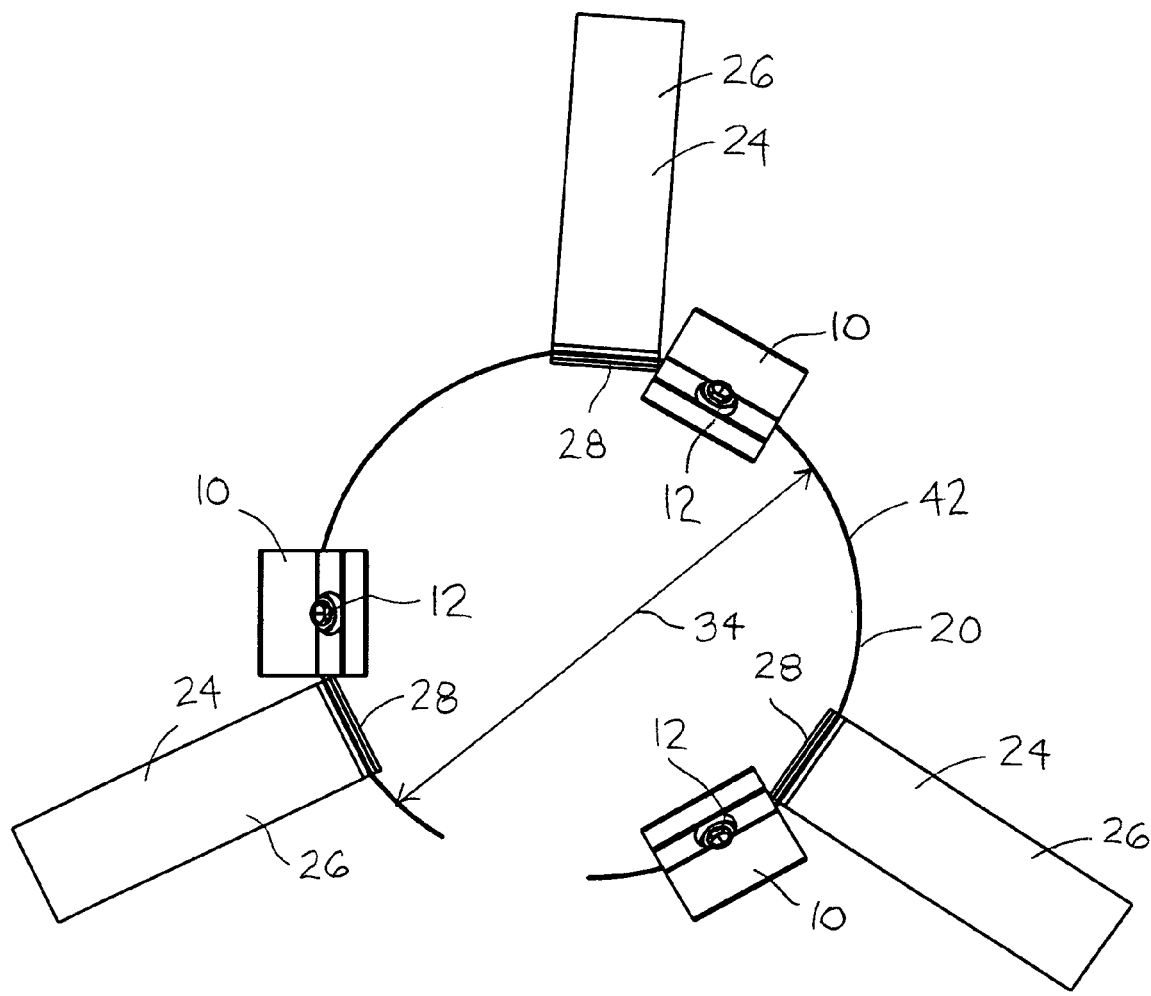
FIG. 6 is top view of an anti-siphon installation assembly.

FIG. 5 is side cross sectional view of the installation assembly 42 of FIG. 4 with an anti-siphon device 44 installed on retainer clips 10, and with locator clips 24 (FIG. 4) removed. The installation assembly 42, with the locator clips 24 removed, may be referred to as an installed anti-siphon support system 58. The anti-siphon device 44 may be installed on support system 58 by lowering the anti-siphon device 44 into fuel filler neck 38 until an upper lip 56 of anti-siphon device 44 abuts stop surface 22 of each of retainer clips 10. In this embodiment the stop surface 22 may be positioned above recess 18. In other embodiments, stop surface 22 may be positioned in a different location, such as below recess 18. Accordingly, in another embodiment, upper lip 56 of anti-siphon device 44 may snap into recess 18 to retain anti-siphon device 44 in place within fuel filler neck 38. Anti-siphon device 44 may include tabs (not shown) that may move into a circumferentially outwardly extending position after the tabs on anti-siphon device 44 are moved downwardly past retainer clips 10 so that the tabs may inhibit removal of anti-siphon device 44 from support system 58 and fuel filler neck 38.

FIG. 6 is top view of an anti-siphon installation assembly 42 prior to installation within fuel filler neck 38 (FIG. 5) and prior to installation of anti-siphon device 44 (FIG. 5) thereon. In this embodiment, installation assembly 42 includes three retainer clips 10 and three locator clips 24 mounted on spring 20. In other embodiments, other numbers of retainer clips 10 and/or locator clips 24 may be utilized.

Other variations and modifications of the concepts described herein may be utilized and fall within the scope of the claims below.

We claim:

1. An anti-siphon installation assembly, comprising:
   a spring;
   a retainer clip mounted on said spring, said retainer clip including a support surface adapted to support an anti-siphon device thereon; and
   a locator clip mounted on said spring, said locator clip including an outwardly extending arm adapted to contact an upper surface of a fuel filler neck opening.

2. The assembly of claim 1 wherein said spring comprises a leaf spring that defines a substantially circular shape.

3. The assembly of claim 1 wherein said retainer clip includes a recess, and wherein said spring is received within said recess.

4. The assembly of claim 1 wherein said locator clip includes a hook positioned distal from said outwardly extending arm, said hook releasably mounted on said spring.

5. The assembly of claim 1 wherein said retainer clip includes an aperture extending therethrough and a fastener movably secured within said aperture, said fastener adapted to secure said retainer clip to an interior wall of a fuel filler neck.

6. The assembly of claim 2 wherein said retainer clip is mounted radially outwardly of said spring.

7. The assembly of claim 1 further comprising:
   a second a retainer clip mounted on said spring, said second retainer clip including a support surface adapted to support an anti-siphon assembly thereon; and
   a second locator clip mounted on said spring, said second locator clip including an outwardly extending arm adapted to contact the upper surface of a fuel filler neck opening.

8. An anti-siphon assembly, comprising:
   a spring;
   a retainer clip mounted on said spring, said retainer clip including an aperture extending therethrough and a support surface;
   a fastener movably positioned within said aperture and adapted to contact an interior wall of a fuel filler neck so as to retain said retainer clip thereon; and
   an anti-siphon device supported on said support surface of said retainer clip.

9. The assembly of claim 8 wherein said spring comprises a leaf spring that defines a substantially circular shape, wherein said spring biases said retainer clip radially outwardly and into contact with said interior wall of said fuel filler neck.

10. The assembly of claim 8 wherein said retainer clip includes a recess, and wherein said spring is received within said recess.

11. The assembly of claim 9 wherein said retainer clip is mounted radially outwardly of said spring.

12. The assembly of claim 8 further comprising a second retainer clip mounted on said spring, said second retainer clip including a support surface adapted to support said anti-siphon assembly thereon.

* * * * *